United States Patent
Wells

[11] Patent Number: 5,544,400
[45] Date of Patent: Aug. 13, 1996

[54] ROTARY JOINT INTERNAL SPRING COMPRESSOR

[76] Inventor: John E. Wells, 124 Lakeland Dr., West Monroe, La. 71291

[21] Appl. No.: 335,251

[22] Filed: Nov. 7, 1994

[51] Int. Cl.⁶ ............................................. B23P 19/04
[52] U.S. Cl. ............................................. 29/227; 29/267
[58] Field of Search ...................... 29/227, 267; 254/131, 254/15, 17, 113

[56] References Cited

U.S. PATENT DOCUMENTS

| | | | |
|---|---|---|---|
| 1,041,660 | 10/1912 | Nelson | 29/267 |
| 1,459,692 | 6/1923 | Prescott | 29/227 |
| 2,540,388 | 2/1951 | Dreeben | 254/131 |
| 2,681,791 | 6/1954 | Hahn | 254/131 |
| 3,368,288 | 2/1968 | Bell | 29/227 |
| 3,817,549 | 6/1974 | Bohannon et al. | 29/227 |
| 4,276,684 | 7/1981 | Mattson | 29/227 |
| 5,248,127 | 9/1993 | Young | 254/15 |

Primary Examiner—Robert C. Watson
Attorney, Agent, or Firm—Laurence R. Brown

[57] ABSTRACT

A tool for compressing and holding the internal spring of a rotary joint 15 for the easy and safe removal and installation of the assembly plate screw/s having at one end an anchor (1) perpendicular to a spacer (2), which is perpendicular to a riser (3), which is parallel to the anchor. The end of the riser opposite the spacer is connected to a lever (4) at hinge (9). The hinge is secured with hinge pin (10) and allows the lever to fold parallel to the spacer. A bell hanger (5) is connected to the lever parallel to the spacer when in the extended position and parallel to the riser when in the folded position. The bell hanger is inserted into a bell (6) and retainer (8) which are secured by a bell keeper (7).

4 Claims, 3 Drawing Sheets

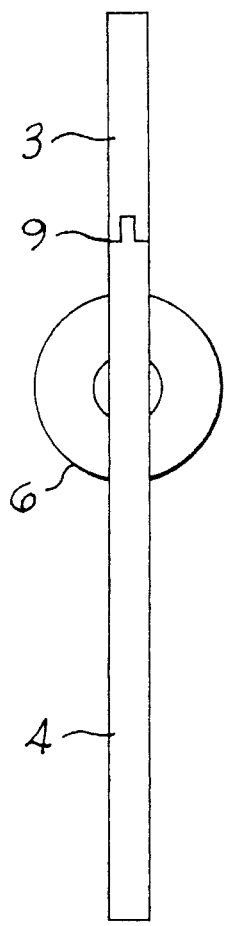
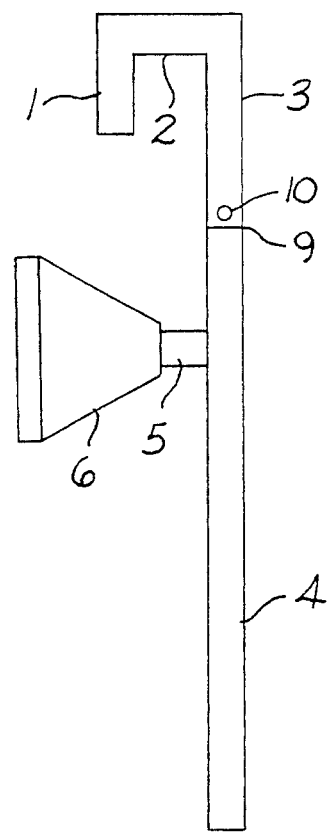
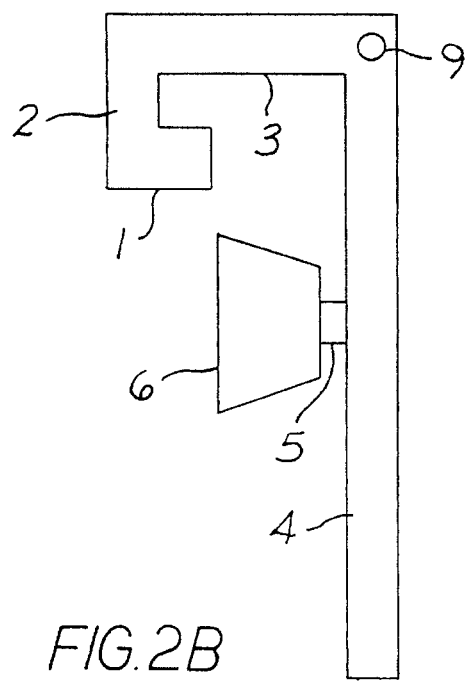
FIG. 1
FIG. 2A
FIG. 2B

ROTARY JOINT INTERNAL SPRING COMPRESSOR

BACKGROUND—FIELD OF INVENTION

This invention relates to a tool which compresses the internal spring of a rotary joint to allow safe and easy removal or installation of assembly plate screw/s which secure said assembly plate to the rotary joint.

BACKGROUND—DESCRIPTION OF PRIOR ART

Rotary joints are commonly employed in various manufacturing processes and have internal parts which are designed to wear and require periodic maintenance and replacement. The internal parts of many rotary joints are held in place by an assembly plate which is secured by one or more screws.

Rotary joint maintenance is normally performed by two mechanics with the rotary joint in place often in cramped and environmentally unsafe conditions. In disassembling and assembling a rotary joint having an assembly plate, one worker pushes against the assembly plate with his/her hands to compress the internal spring while the second removes or installs the assembly plate screw/s which secure the assembly plate to the rotary joint.

Heretofore, inventors have created several types of spring compressors, holders, and clamps under Class 29, Subclass 267, 270, 426.6, 426.5, 451, and 525.1; however, none of these patents is designed for or applicable to compressing and holding the internal spring of a rotary joint having an assembly plate.

OBJECTS AND ADVANTAGES

Accordingly, several objects and advantages of a rotary joint internal spring compressor are:

(a) to provide a tool which allows compression of a rotary joint internal spring while the assembly plate screw/s are removed or installed;

(b) to provide a tool which allows compression of a rotary joint internal spring without direct "hands on" contact with a rotary joint which may be hot, oily, wet or for other reasons difficult and unsafe to handle;

(c) to provide a tool which allows the safe control of internal spring tension while removing or replacing the assembly plate screw/s;

(d) to provide a tool which allows work to be performed away from the hazard of flashback or blow-out while removing or replacing the assembly plate screw/s in rotary joints;

(e) to provide a tool which lessens fatigue in cramped space thereby making it possible for work to be performed more safely and more efficiently in an environmentally unsafe area;

Further objects and advantages are to provide a tool which until now has not existed, which is simple to use and inexpensive to manufacture, which is light-weight, which is compact, which requires little maintenance, which will not damage or mar a rotary joint or its various parts, and which can be easily and safely operated.

DRAWING FIGURES

In the drawings, closely related figures have the same number but different alphabetic suffixes.

FIG. 1 shows a top view of the rotary joint internal spring compressor having riser, hinge, bell, and lever.

FIGS. 2A and 2B show a side view of the rotary joint internal spring compressor with hinge extended and folded having anchor, spacer, riser, hinge pin, hinge, bell hanger, bell, and lever.

Figure 3:
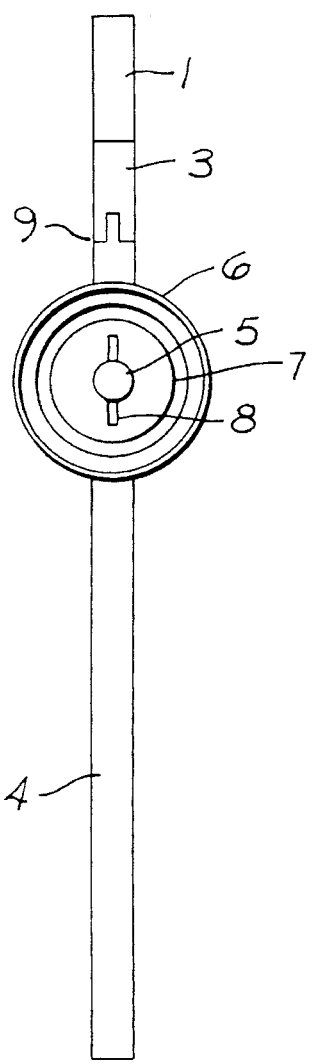
FIG. 3 shows a bottom view of the rotary joint internal spring compressor having anchor, riser, hinge, bell, bell hanger, bell keeper, retainer, and lever.
Figure 5:
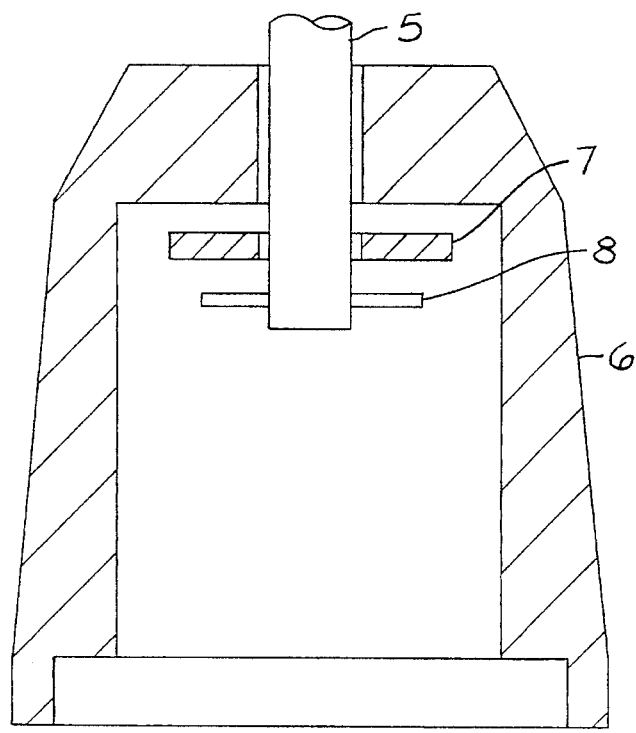
FIG. 5 shows a side partial view of rotary joint internal spring compressor hinge.
Figure 4:
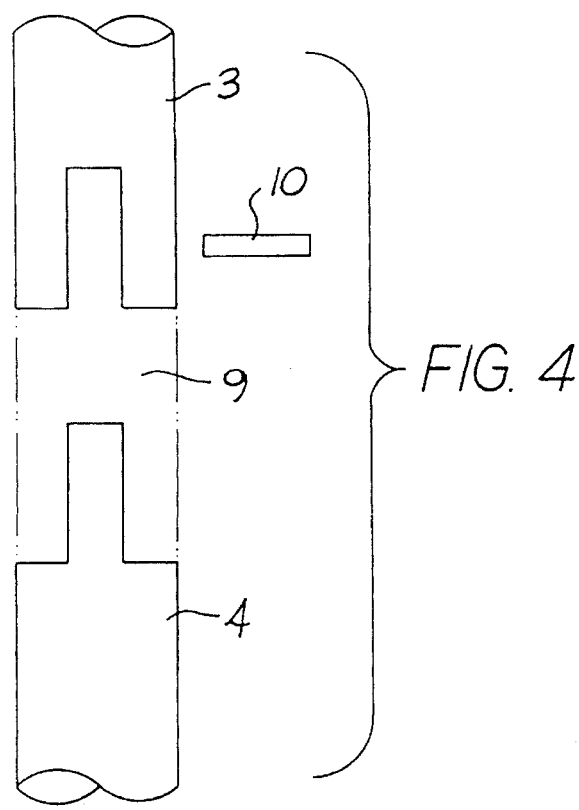
FIG. 4 shows a top partial view of rotary joint internal spring compressor hinge.
Figure 6:
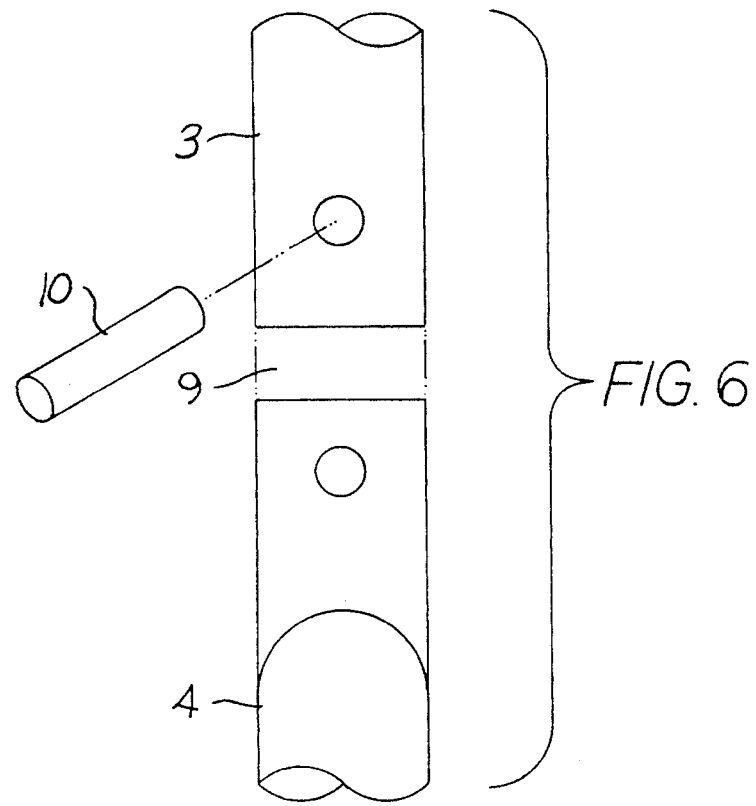
FIG. 6 shows a sectional view of rotary joint internal spring compressor bell with bell hanger, retainer, and bell keeper.

DESCRIPTION—FIGS. 1 to 6

A typical configuration of the rotary joint internal spring compressor is illustrated in FIG. 1 (top view) and in FIGS. 2A and 2B (side views). The anchor 1, spacer 2, riser 3, lever 4, and bell hanger 5 consisting of one of several of non-ferrous metals such as aluminum or brass or of one of several ferrous alloys such as stainless or cast steel. The bell 6 typically to be made of ferrous or non-ferrous metal or plastic, such as poly-ethylene-tere-phthalate (PET-hyphens here supplied to facilitate pronunciation)-available from Eastman Chemical Co. of Kingsport, Tenn. However, the bell 6 can consist of any other material that can be nylon, rubber, leather, various impregnated or laminated fibrous materials, various plasticized materials, etc.

At one end of rotary joint internal spring compressor is anchor 1 perpendicular to and connected to spacer 2, which is perpendicular to and connected to riser 3, which is parallel to anchor 1. The end of riser 3 opposite spacer 2 is connected to lever 4 at hinge 9. Hinge 9 is secured with hinge pin 10 and allows lever 4 to fold parallel to spacer 2. Bell hanger 5 is connected to lever 4 parallel to spacer 2. Bell hanger 5 is inserted into bell 6 and retainer 8 which are secured by bell keeper 7. Bell 6 and retainer 8 are allowed to freely slide along bell hanger 5 between bell keeper 7 and lever 4.

OPERATION

The manner of using the rotary joint internal spring compressor (FIG. 2A) to remove the assembly plate screw/s is to insert anchor 1 into the back of one of the rotary joint 15 face bolt holes 16. Bring spacer 2 against backside of rotary joint face 17 causing the riser 3 to extent perpendicular to the face of the rotary joint. Next, by folding hinge 9 (FIG. 2B), bring lever 4 across and parallel to the face 17 of the rotary joint. Lever 4 should be aligned with rotary joint face bolt hole opposite to the rotary joint face bolt hole in which anchor 1 is inserted. Next, place bell 6 (FIGS. 2A and 2B), which is affixed to bell hanger 5, over the packing gland 18 of the rotary joint 15. Now, press lever 4 toward the rotary joint face applying sufficient force to compress the rotary joint internal spring thereby allowing safe and easy removal of assembly plate screw/s. After assembly plate screw/s are removed, slowly release force on lever 4 to permit the removal of the tool from the rotary joint 15.

The manner of using the rotary joint internal spring compressor to replace the assembly plate screw/s is to connect the tool to the rotary joint in the same manner as described above for the removal of the assembly plate screw/s. By compressing the internal spring with sufficient force, the assembly plate can be placed against the rotary joint face 17 and aligned to install assembly plate screw/s. After assembly plate screw/s are replaced, slowly release force on lever 4 to permit the removal of the tool from the rotary joint 15.

SUMMARY, RAMIFICATIONS, AND SCOPE

Accordingly, the reader will see that the rotary joint internal spring compressor is compact and light-weight and can be used to compress and hold a rotary joint internal spring so that the assembly plate screw/s in a rotary joint can be easily and safely removed and/or installed without mar or damage to the rotary joint or its various parts. In addition, the rotary joint internal spring compressor will lessen fatigue incurred when removing and/or installing assembly plate screw/s in cramped or confined spaces thereby making it possible to perform the work more safely and more efficiently in an environmentally unsafe area. Furthermore, the rotary joint internal spring compressor has the additional advantages in that

- it permits easy compression and holding of a rotary joint internal spring while the assembly plate screw/s are removed or installed without direct "hands on" contact with a rotary joint;
- it provides a tool which easily and safely controls internal spring tension to prevent the pop off of the assembly plate while the assembly plate screw/s are removed or replaced;
- it permits work to be performed away from the hazard of flashback or blow-out while removing or replacing the assembly plate screw/s in rotary joints.

Although the description above contains many specificities, these should not be construed as limiting the scope of the invention but as merely providing illustrations of some of the presently preferred embodiments of this invention. For example, the rotary joint internal spring compressor bell can have other shapes, such as cylindrical, pyramidical, semi-spherical, spider or cage configurations, etc.; the riser can be constructed of chain, cable, strap, etc.

Thus the scope of the invention should be determined by the appended claims and their legal equivalents, rather than by the examples given.

I claim:

1. A maintenance tool for compressing an internal spring in a rotary joint assembly having a cover plate and internal spring pressing thereagainst, said cover plate being affixed in place on said assembly by removable fasteners, and an accessible movable member available external to the assembly for compressing the internal spring during maintenance assembly and disassembly of the rotary joint, comprising in combination:

a first manually operable compression lever arm member coupled to a second anchor lever arm member by a hinge, engagement means coupled to the first lever arm member remote from the hinge and adapted to engage and move said movable member into a position compressing the spring, anchoring means coupled to a position on said second anchor lever arm at a position remote from the hinge adapted to engage the rotary joint for supporting the maintenance tool, said lever arms having said engagement means and said anchoring means respectively positioned for engaging the rotary joint with the engagement means and the anchoring means with the lever arms at the hinge substantially perpendicularly disposed, and a manual operating handle extension portion on the first lever arm member extending away from the rotary joint to a position operable by a maintenance worker to compress the spring while the operator adjusts the removable fasteners affixing the removable plate to the rotary joint assembly with the operator in a position lateral to the cover plate, thereby permitting safe removal and replacement of the cover plate with the internal spring compressed.

2. A maintenance tool as defined in claim 1 wherein the engagement means comprises a bell-shaped member affixed to the first lever arm member.

3. A maintenance tool as defined in claim 2, wherein the rotary joint accessible movable member is a packing gland, and wherein the bell-shaped member has an opening for mating with the packing gland.

4. A maintenance tool as defined in claim 1, wherein the anchoring means comprises an anchor member shaped and positioned to engage a fastener hole in the rotary joint assembly.

* * * * *